United States Patent
Murakami et al.

(10) Patent No.: US 10,293,709 B2
(45) Date of Patent: May 21, 2019

(54) RECLINING APPARATUS FOR SEAT FOR VEHICLE AND SEAT FOR VEHICLE WITH RECLINING APPARATUS

(71) Applicant: NHK SPRING CO., LTD., Kanazawa-ku, Yokohama-shi (JP)

(72) Inventors: Toru Murakami, Yokohama (JP); Kiyomi Sakai, Yokohama (JP); Mitsuaki Oda, Yokohama (JP)

(73) Assignee: NHK SPRING CO., LTD., Yokohama-shi (JP)

( * ) Notice: Subject to any disclaimer, the term of this patent is extended or adjusted under 35 U.S.C. 154(b) by 29 days.

(21) Appl. No.: 15/479,685

(22) Filed: Apr. 5, 2017

(65) Prior Publication Data

US 2017/0297457 A1 Oct. 19, 2017

(30) Foreign Application Priority Data

Apr. 14, 2016 (JP) .................................. 2016-081389

(51) Int. Cl.
*B60N 2/02* (2006.01)
*B60N 2/225* (2006.01)
*B60N 2/68* (2006.01)

(52) U.S. Cl.
CPC ......... *B60N 2/0232* (2013.01); *B60N 2/2252* (2013.01); *B60N 2/682* (2013.01);
(Continued)

(58) Field of Classification Search
CPC .... B60N 2/0232; B60N 2/2252; B60N 2/682; B60N 2/0224; B60N 2002/0236; B60N 2002/024; B60N 2205/20; B60N 2205/50
(Continued)

(56) References Cited

U.S. PATENT DOCUMENTS

| 4,402,547 A * | 9/1983 | Weston ................ B60N 2/0232 292/DIG. 22 |
| 7,695,068 B2 * | 4/2010 | Maeda ................ B60N 2/0232 297/362.11 |

(Continued)

FOREIGN PATENT DOCUMENTS

JP          2006-306188 A       11/2006

*Primary Examiner* — Mark R Wendell
(74) *Attorney, Agent, or Firm* — Flynn Thiel, P.C.

(57) ABSTRACT

An object of the present invention is to provide a seat for a vehicle which is capable of smoothly and stably adjusting the reclining of a seat back by driving an electrical reclining motor 34, even if the electrical reclining motor 34 is diagonally mounted on a seat back frame structure in a case where the electrical reclining motor 34 is fixedly connected on a seat back frame structure, or even if the electrical reclining motor 34 becomes inclined due to a deformation of the seat back frame structure after such a fixedly connection. There is provided a seat 10 for a vehicle comprising a seat back frame structure 12 a lower end of which is connected to a rear end of a seat cushion frame structure 14 in such a way that the seat back frame structure 12 can be inclined relative to the seat cushion frame structure 14, said seat back frame structure 12 including a pair of side frames 20A,B each of which extends in a vertical direction of the vehicle, said seat 10 for the vehicle further comprising a through-hole 28 provided on a lower end portion of each of the pair of side frames 20A,B, a connecting rod 30 extending through each of the through-holes 28 so as to be rotatable about a horizontal direction, an electrical reclining motor 34 rotating said connecting rod 30 and provided along the one of side surfaces of the one of said pair of side frames 20A,B, and a reclining apparatus 16 provided on the other of the side surfaces of each of said pair of side frames 20A,B, a bolt through-hole 72 being provided on a non-rotational driven solid portion of said electrical reclining motor 34, a bolt 74

(Continued)

which fits into said bolt through-hole 72 is provided for fixedly bolting said electrical reclining motor 34 on said one of the side surfaces of the one of the pair of side frames 20A,B, said bolt 74 comprising a head portion 76 and a shank portion 78 with a circular cross-section, said shank portion 78 comprises an enlarged-diameter portion 82 on its end portion and a reduced-diameter portion 84 adjacent to the enlarged-diameter portion 82 with being concentric to each other.

17 Claims, 7 Drawing Sheets

(52) U.S. Cl.
 CPC .............. *B60N 2002/024* (2013.01); *B60N 2002/0236* (2013.01); *B60N 2205/20* (2013.01); *B60N 2205/50* (2013.01)

(58) Field of Classification Search
 USPC .............. 297/362.11, 361.1, 354.1, 353
 See application file for complete search history.

(56) References Cited

U.S. PATENT DOCUMENTS

| | | | |
|---|---|---|---|
| 7,775,594 B2* | 8/2010 | Bruck | B60N 2/20 297/362 |
| 2011/0233980 A1* | 9/2011 | Hoshi | B60N 2/0232 297/354.1 |
| 2013/0300174 A1* | 11/2013 | Ito | B60N 2/1615 297/354.1 |
| 2016/0059752 A1* | 3/2016 | Kishida | F16H 57/039 297/344.12 |

\* cited by examiner

RECLINING APPARATUS FOR SEAT FOR VEHICLE AND SEAT FOR VEHICLE WITH RECLINING APPARATUS

FIELD OF THE INVENTION

The present invention relates to a reclining apparatus for a seat for a vehicle and the seat for the vehicle with said reclining apparatus, and, in particular, relates to such reclining apparatus for the seat for the vehicle and the seat for the vehicle with said reclining apparatus which are capable of smoothly and stably adjusting the reclining of a seat back by driving an electrical reclining motor, even if the electrical reclining motor is diagonally mounted on a seat back frame structure in a case where the electrical reclining motor is fixedly connected on the seat back frame structure, or even if the electrical reclining motor becomes inclined due to a deformation of the seat back frame structure after such a fixedly connection.

BACKGROUND OF THE INVENTION

Conventionally, a seat for a vehicle in which a seat back can be inclined relative to a seat cushion in a desired manner by means of an electrical means has been used.

The Japanese Patent Laid-open Publication 2006-306188, for instance, discloses one example of such a seat for a vehicle.

Such a seat for a vehicle comprises a seat back frame structure a lower end of which is connected to a rear end of a seat cushion frame structure in such a way that the seat back frame structure can be inclined relative to the seat cushion frame structure. The seat back frame structure includes a pair of side frames each of which extends in a vertical direction of the vehicle. A through-hole is provided on a lower end portion of each of the pair of side frames, a connecting rod which extends through each of the through-holes is provided so as to be rotatable about a horizontal direction. An electrical reclining motor which rotates said connecting rod is provided along the one of side surfaces of the one of said pair of side frames. A reclining apparatus is provided on the other of the side surfaces of each of said pair of side frames.

The reclining apparatus comprises an internal teeth gear which includes internal teeth and is fixed to the one of the pair of side frames, an external teeth gear which is concentric to the connecting rod and includes outer teeth whose number of teeth is less than that of the internal teeth, and an external teeth gear which is concentric to the connecting rod so as to mate with the internal teeth gear and is fixed on the seat cushion frame structure, and an eccentric driving means for driving said internal teeth gear in an eccentric manner by being driven by means of the rotation of the connecting rod.

According to the seat for a vehicle including the above structure, the seat back frame structure can be inclined relative to the seat cushion frame structure in a desired manner by rotating the connecting rod about a horizontal direction by driving the electrical reclining motor and using the eccentric driving means of the reclining apparatus to drive the internal teeth gear in an eccentric manner so as to make the external teeth whose number of the teeth is less than that of the internal teeth mate with the internal teeth.

However, in the above seat for a vehicle, a following technical problem arises due to the fact that the electrical reclining motor and the reclining apparatus do not constitute a single unit, but are provided separately from each other.

In a case where the electrical reclining motor is fixedly connected on the one of the pair of side frames of the seat back frame structure, the electrical reclining motor can become inclined due to the fact that the electrical reclining motor is diagonally mounted on a seat back frame structure, or that the seat back frame structure is deformed after such a connection.

In such a case, a stable reclining action becomes difficult, since hammering (foreign sound) is generated between a shaft and the connecting rod, and the shaft or the connecting rod can become worn with time.

In short, it is technically difficult to smoothly adjust the reclining of the seat back by driving the electrical reclining motor.

SUMMARY OF THE INVENTION

In view of the above technical problems, an object of the present invention is to provide a reclining apparatus for a seat for a vehicle and the seat for the vehicle with said reclining apparatus which are capable of smoothly and stably adjusting the reclining of a seat back by driving an electrical reclining motor, even if the electrical reclining motor is diagonally mounted on a seat back frame structure in a case where the electrical reclining motor is fixedly connected on the seat back frame structure, or even if the electrical reclining motor becomes inclined due to a deformation of the seat back frame structure after such a fixedly connection.

In view of the above technical problems, according to an aspect of the invention, there is provided a seat for a vehicle comprising a seat back frame structure a lower end of which is connected to a rear end of a seat cushion frame structure in such a way that the seat back frame structure can be inclined relative to the seat cushion frame structure, said seat back frame structure including a pair of side frames each of which extends in a vertical direction of the vehicle, said seat for the vehicle further comprising a through-hole provided on a lower end portion of each of the pair of side frames, a connecting rod extending through each of the through-holes so as to be rotatable about a horizontal direction, an electrical reclining motor rotating said connecting rod and provided along the one of side surfaces of the one of said pair of side frames, and a reclining apparatus provided on the other of the side surfaces of each of said pair of side frames, a bolt through-hole being provided on a non-rotational driven solid portion of said electrical reclining motor, a bolt which fits into said bolt through-hole is provided for fixedly bolting said electrical reclining motor on said one of the side surfaces of the one of the pair of side frames, said bolt comprising a head portion and a shank portion with a circular cross-section, said shank portion comprises an enlarged-diameter portion on its end portion and a reduced-diameter portion adjacent to the enlarged-diameter portion with being concentric to each other.

According to the seat for the vehicle including the above structure, the seat back frame structure can be inclined relative to the seat cushion frame structure in a desired manner by rotating the connecting rod about a horizontal direction by driving the electrical reclining motor and using the reclining apparatus.

In a case where the electrical reclining motor is fixed on the side surface of one of the pair of side frames by bolt, since the bolt which fits into said bolt through-hole and is provided for fixedly bolting said electrical reclining motor on said one of the side surfaces of the one of the pair of side frames comprises a head portion and a shank portion with a circular cross-section, and said shank portion comprises an enlarged-diameter portion on its end portion and a reduced-diameter portion adjacent to the enlarged-diameter portion with being concentric to each other, the reclining of the seat back can be smoothly and stably adjusted by making the inclination of the electrical reclining motor feasible, even if the electrical reclining motor is diagonally mounted on a seat back frame structure in a case where the electrical reclining motor is fixedly connected on the seat back frame structure, or even if the electrical reclining motor becomes inclined due to a deformation of the seat back frame structure after such a fixedly connection.

In another embodiment of the present invention, a step of a stepped portion between said enlarged-diameter portion and said reduced-diameter portion and/or a width in a longitudinal direction of said shank portion of said enlarged-diameter portion are set so as to keep an intersecting angle between said electrical reclining motor and said connecting rod constant.

In another embodiment of the present invention, said step of the stepped portion between said enlarged-diameter portion and said reduced-diameter portion and said width in a longitudinal direction of said shank portion of said enlarged-diameter portion are set so as to keep an intersecting angle between said electrical reclining motor and said connecting rod constant.

In another embodiment of the present invention, said electrical reclining motor is bolted on said one of the pair of side frames by making said bolt pass through the bolt through-hole after a rubber bush passes through said head portion.

In another embodiment of the present invention, said electrical reclining motor is provided along an inner surface of said one of said pair of side frames so as to make said bolt through-hole horizontally oriented, said reclining apparatus is provided on an outer surface of the side surfaces of each of said pair of side frames, said bolt is made to pass through said bolt through-hole and said pair of side frames to be tightened with nut at said outer surface of the side surfaces of each of said pair of side frames.

In another embodiment of the present invention, said step of the stepped portion between said enlarged-diameter portion and said reduced-diameter portion is set in accordance with a length of said bolt through-hole.

In another embodiment of the present invention, said enlarged-diameter portion is provided on an end portion opposite to said head portion, said width in a longitudinal direction of said shank portion of said enlarged-diameter portion is set in accordance with a length of said bolt through-hole.

In another embodiment of the present invention, said reclining apparatus comprises an internal teeth gear which is provided around said connecting rod and is fixed on said seat cushion frame structure or said one of the pair of side frames, an external teeth gear which provided around said connecting rod so as to mate with said internal teeth gear and is fixed on said one of the pair of side frames or said seat cushion frame structure, and an eccentric driving means for driving said internal teeth gear or said external teeth gear in an eccentric manner by being driven by means of the rotation of said connecting rod.

In another embodiment of the present invention, said internal teeth gear comprises internal teeth provided around said connecting rod in a concentric manner, and said external teeth gear comprises external teeth provided around said connecting rod in a concentric manner with the number of its teeth mating with said internal teeth being less than that of the internal teeth.

In view of the above technical problems, according to an aspect of the invention, there is provided a reclining unit comprising a through-hole provided on a lower end portion of each of a pair of side frames of a seat back frame structure, a connecting rod extending through each of the through-holes so as to be rotatable about a horizontal direction, an electrical reclining motor rotating said connecting rod and provided along one of side surfaces of one of said pair of side frames, and a reclining apparatus provided on the other of the side surfaces of each of said pair of side frames, said reclining apparatus comprising an internal teeth gear which is provided around said connecting rod and is fixed on said seat cushion frame structure or said one of the pair of side frames, an external teeth gear which provided around said connecting rod so as to mate with said internal teeth gear and is fixed on said one of the pair of side frames or said seat cushion frame structure, and an eccentric driving means for driving said internal teeth gear or said external teeth gear in an eccentric manner by being driven by means of the rotation of said connecting rod, a bolt through-hole being provided on a non-rotational solid portion of said electrical reclining motor, a bolt which fits into said bolt through-hole being provided for fixedly bolting said electrical reclining motor on said one of the side surfaces of the one of the pair of side frames, said bolt comprising a head portion and a shank portion with a circular cross-section, said shank portion comprising an enlarged-diameter portion on its end portion and a reduced-diameter portion adjacent to the enlarged-diameter portion with being concentric to each other, and a step of a stepped portion between said enlarged-diameter portion and said reduced-diameter portion and said width in a longitudinal direction of said shank portion of said enlarged-diameter portion being set so as to keep an intersecting angle between said electrical reclining motor and said connecting rod constant.

DETAILED DESCRIPTION OF EMBODIMENTS OF THE INVENTION

An embodiment of a seat for a vehicle of the present invention will be described in detail with reference to the drawings as an example.

Figure 1:
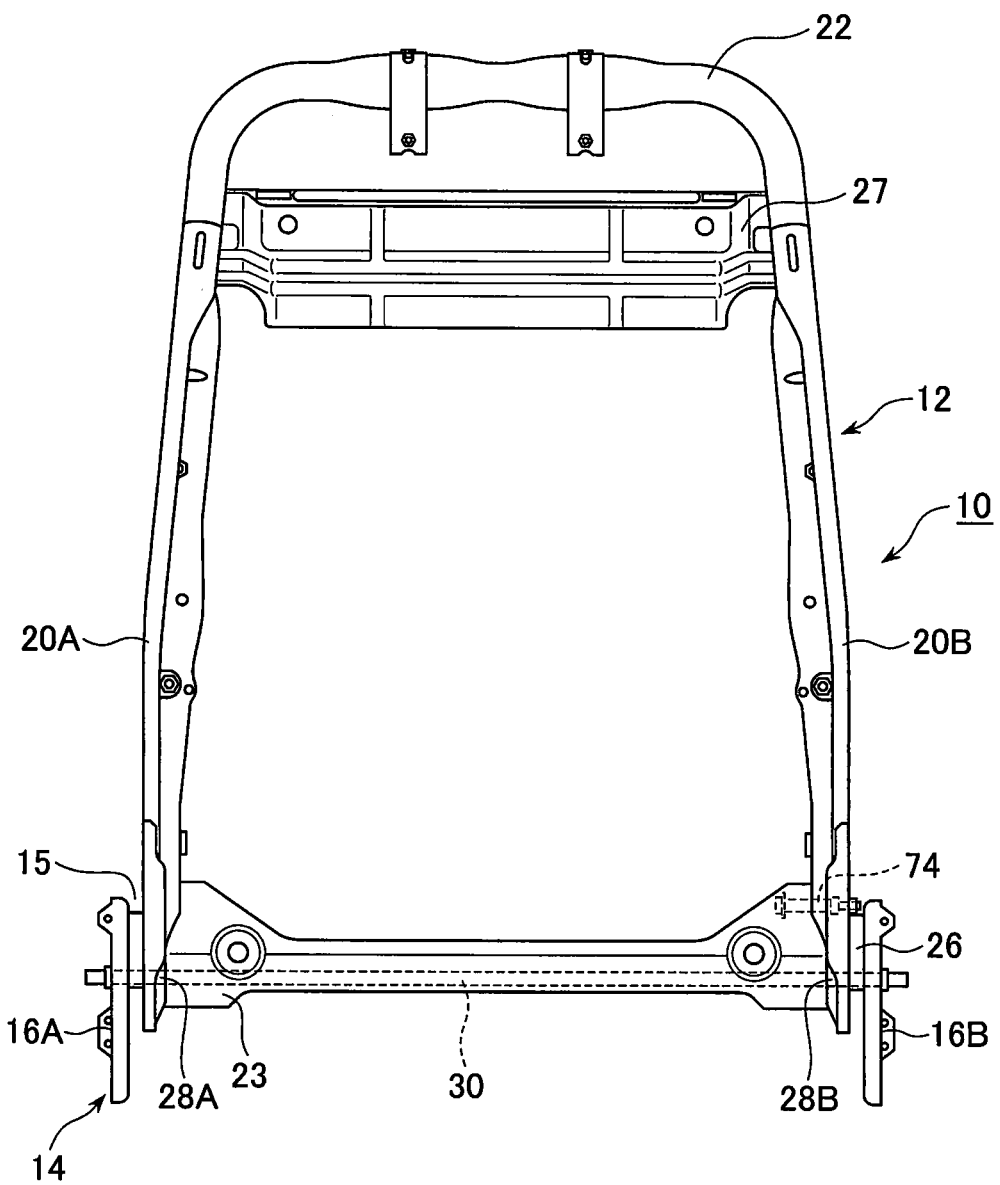
FIG. 1 is a general front view showing the seat for a vehicle in an embodiment of the present invention.
Figure 2:
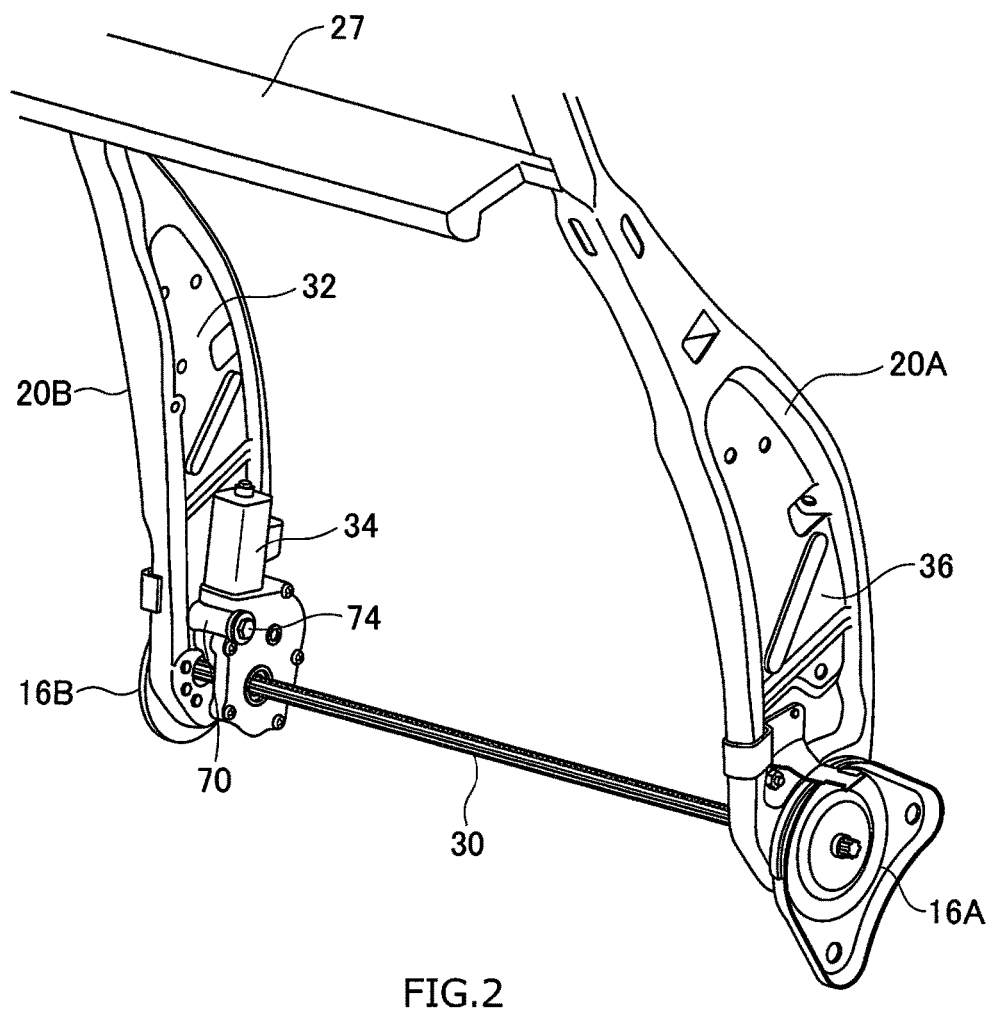
FIG. 2 is a partially detailed view showing the pair of side frames 20A,B of the seat for the vehicle in the embodiment of the present invention.

As shown in FIGS. 1 and 2, a seat 10 for a vehicle of the present invention comprises a seat frame structure comprising a seat cushion frame structure portion 14 which is fixed on a floor (not shown) of a vehicle compartment, a seat back frame structure portion 12 a lower end portion of which is connected to a rear end portion of the seat cushion frame structure portion 14 so as to be inclined relative thereto, and a reclining apparatus 16 interposed between the seat cushion frame structure portion 14 and the seat back frame structure portion 12, a pad (not shown) so as to cover the entire seat frame structure for the vehicle, and a skin sheet (not shown) so as to cover the entire seat frame structure and the pad.

Explaining about the seat back frame structure portion 12, the seat back frame structure portion 12 is shaped to be a reversed U as a whole and includes a pair of side frames 20A,B each of which extends in the vertical direction, and an upper frame 22 which connects the upper portions of the pair of side frames 20A,B.

Each of the pair side frames 20A,B includes a main side face portion with a width in the longitudinal direction of the vehicle mainly defining an external shape and protruding flange portions inwardly protruding from the front and the rear edges of the main side face portion, respectively, to form a C-shaped cross section inwardly oriented.

A flat mat (not shown) is provided on an opening formed inside of the reversed U-shaped seat back frame structure 12, and the upper frame 22 connecting the upper portions of the pair of side frames 20A,B and a lower member 23 connecting the lower portions of the pair of side frames 20A,B are provided. In addition, a member (not shown) on which a head rest (not shown) is mounted is provided on the upper frame 22. The upper frame 22 is shaped to be a pipe, and each of its lower ends is fitted to the corresponding upper portion of the pair of the side frames 20A,B.

A through-hole 28 is provided on a lower end portion 26 of each of the pair of side frames 20A,B, and a connecting rod 30 extending through each of the through-holes 28 so as to be rotatable about a horizontal direction is provided.

An electrical reclining motor 34 which rotates the connecting rod 30 is provided along the one of side surfaces 32 of the one of said pair of side frames 20A,B, while the reclining apparatus 16 is provided on the other of the side surfaces 36 of each of said pair of side frames 20A,B.

Explaining about the reclining apparatus 16, a pair of reclining apparatuses 16 are mounted on a connecting portion between each of the side surfaces of the seat cushion frame structure portion 14 on which a driver or a crew sits and the corresponding side surface of the seat back frame structure portion 12 against which a driver or a crew leans, one by one. The pair of reclining apparatuses 16 are connected to each other by the connecting rod 30 which extends in the widthwise direction of the seat. Since the one of the pair of reclining apparatuses 16 includes the same structure as the other thereof, one of the reclining apparatuses is explained about hereinafter.

Figure 6:
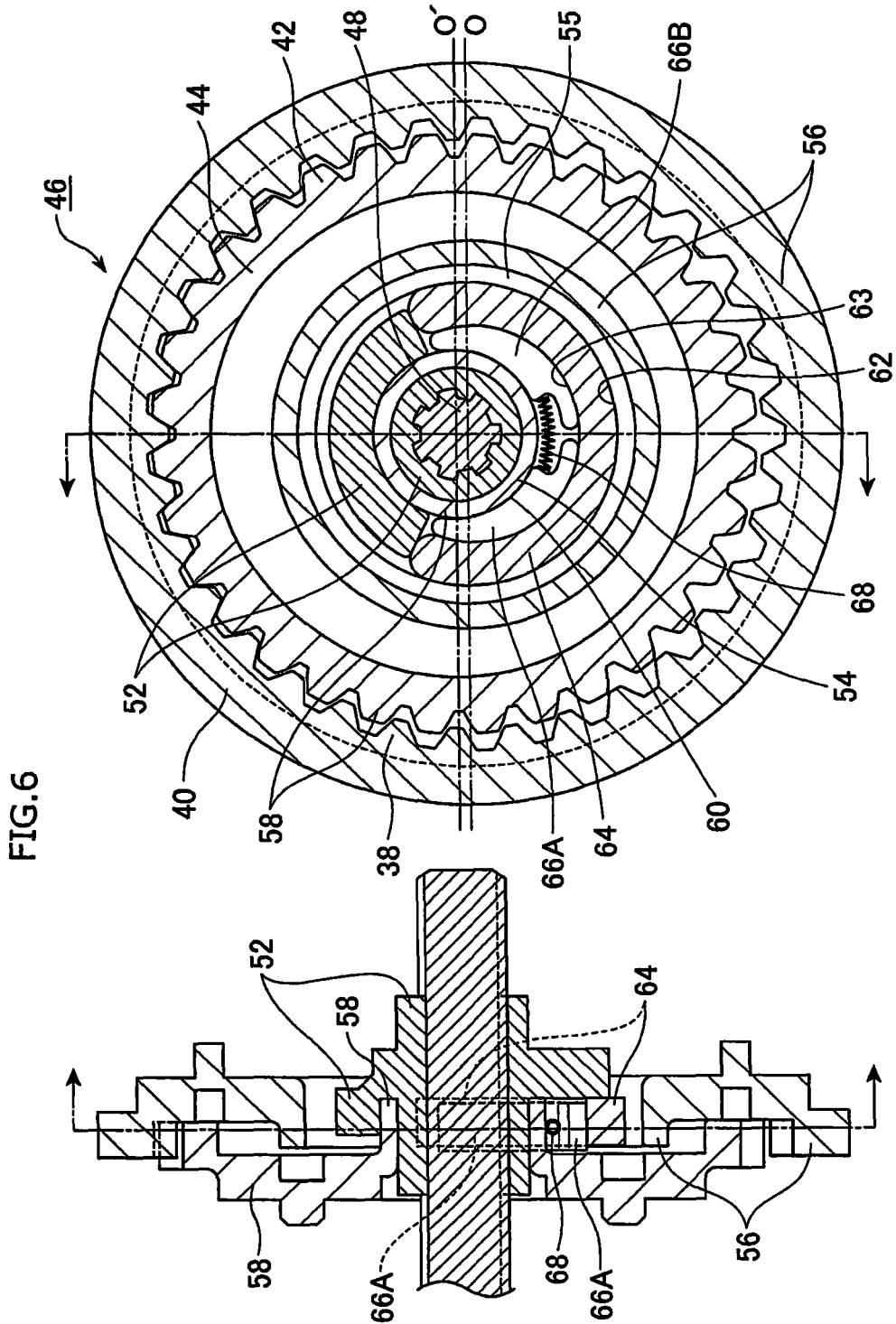
FIG. 6 is a general cross sectional side view and a general front view showing the reclining apparatus 16 of the seat for the vehicle in the embodiment of the present invention.

As shown in FIG. 6, the reclining apparatus 16 comprises an internal teeth gear 40 which is provided around the connecting rod 30 so as to be concentric thereto and is fixed on the seat cushion frame structure 14, an external teeth gear 42 which is provided around the connecting rod 30 so as to be concentric thereto to mate with the internal teeth gear 40 and is fixed on the one of the pair of side frames 20A,B, and an eccentric driving means 46 for driving the external teeth gear 44 in an eccentric manner by being driven by means of the rotation of the connecting rod 30.

The eccentric driving means 46 includes a central shaft 48 fixedly fitted over the connecting rod 30 so as to be rotatable along with the connecting rod 30, so that the eccentric driving means 46 is configured to shift between a center O of the external teeth gear 44 and a center O' which is located to be eccentric to the center O. The central shaft 48 includes an axial portion 50 and a driving protrusion portion 52 provided around the axial portion 50.

The internal teeth gear 40 is provided on an outer plate 56 including a boss 54 through the central portion of which the axial portion 50 of the central shaft 48 extends, while the external teeth gear 44 is provided on an inner plate 58 including a boss 55 through the central portion of which the axial portion 50 of the central shaft 48 extends. Peripheral edge portions of the outer plate 56 and the inner plate 58 are caulked with each other with the central shaft 48 extending through the outer plate 56 and the inner plate 58, for instance.

The eccentric driving means 46 comprises an arcuate bushing 64 which is introduced between an outer peripheral surface 60 of the boss 54 of the internal teeth gear 40 and an inner peripheral surface 62 of the boss 55 of the external teeth gear 44, cams 66A,B each of which is provided between an inner peripheral surface 63 of the arcuate bush 64 and the outer peripheral surface 60 of the boss 54 of the internal teeth gear 40, and a locking spring 68 which biases the cams 66A,B toward a locking direction. The rotation of the central shaft 48 causes the arcuate bush 64 to rotate against the biasing force by the locking spring 68 by means of the driving protrusion 52.

As described above, since the cams 66A,B are biased so as to be wedged by the locking spring 68, the central shaft 48 is always pressed toward a side at which the locking spring 68 is not located, so that the center O' of the central shaft 48 is caused to become eccentric to the center O of the external teeth gear 44. The arcuate bush 64 is moved by means of the driving protrusion 52 by the rotating of the central shaft 48, so that the corresponding cam 66 is caused to shift due to the friction between the corresponding cam 66 and the arcuate bush 64, while at the same time, the other cam 66 is caused to be driven to shift via the locking spring 68.

More specifically, since the number of the teeth of the external teeth gear 44 is set to be less than that of the internal teeth gear 40 by one or two teeth and the outer diameter of the teeth portion of the external teeth gear 44 is set to be smaller than that of the internal teeth gear 40, the center of the internal teeth gear 40 and that of the external teeth gear 44 need to be disposed so as to be eccentric to each other in order to make the internal teeth 38 and the external teeth 42 mate with each other. The position at which the internal teeth 38 and the external teeth 42 mate with each other is caused to shift by circumferentially shifting such an eccentric position. If the eccentric position is caused to shift by one revolution, the mating position is angularly deviated by a difference of the number of teeth between the internal and external teeth 38, 42.

Explaining about the electrical reclining motor 34, the electrical reclining motor 34 itself is a widely-used conventional type, and a bolt through-hole 72 is provided on a non-rotationally driven solid portion 70 of the electrical reclining motor 34.

A bolt 74 which fits into the bolt through-hole 72 is provided in order to bolt the electrical reclining motor 34 on the one side surface 32 of the one of the pair of side frames 20A,B.

Figure 3:
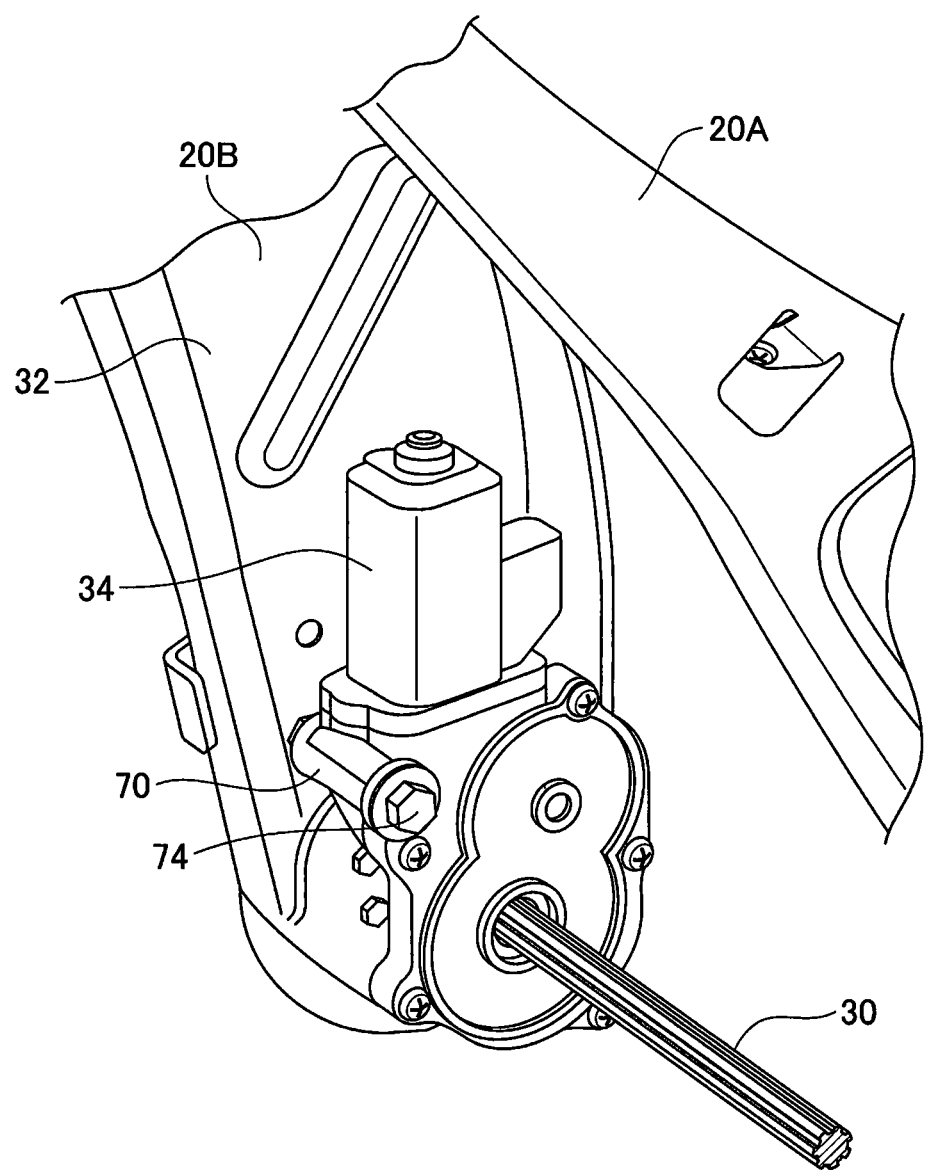
FIG. 3 is a partial perspective view showing the reclining apparatus 16 and the electrical reclining motor 34 of the seat for the vehicle in the embodiment of the present invention.
Figure 4:
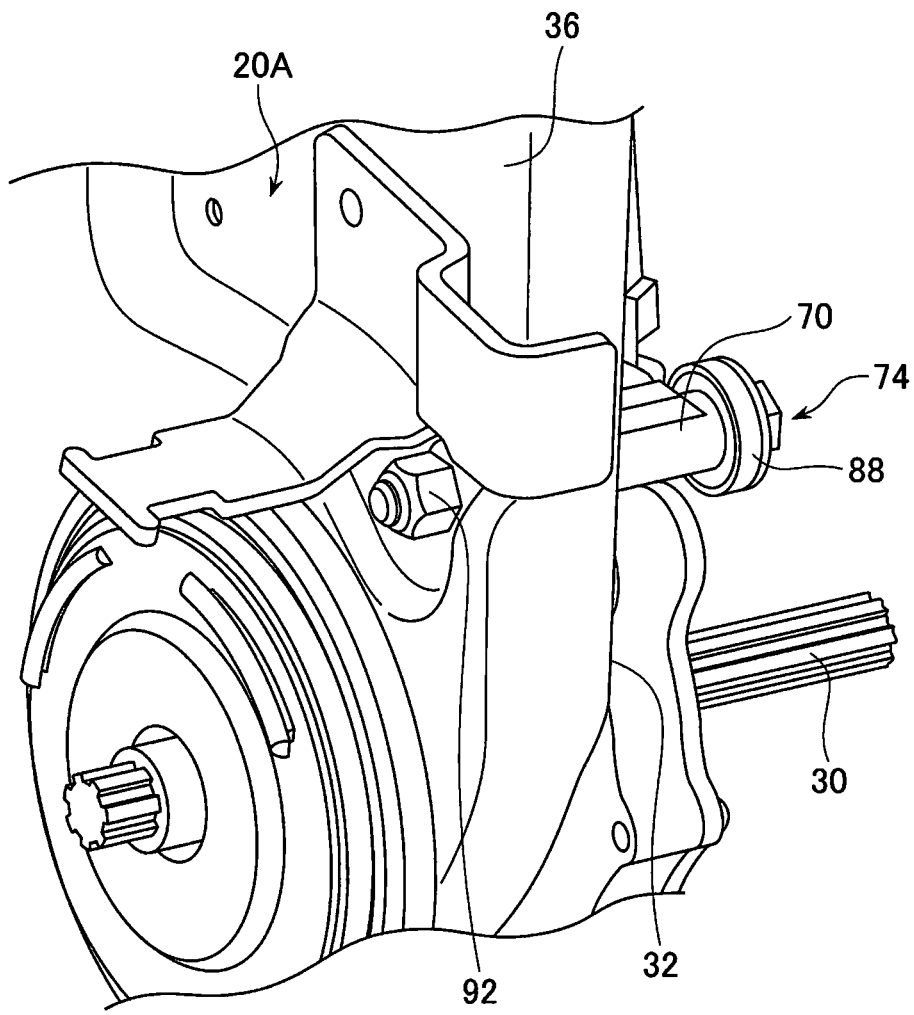
FIG. 4 is a partial perspective view showing a situation in which the electrical reclining motor 34 of the seat for the vehicle in the embodiment of the present invention is bolted.
Figure 5:
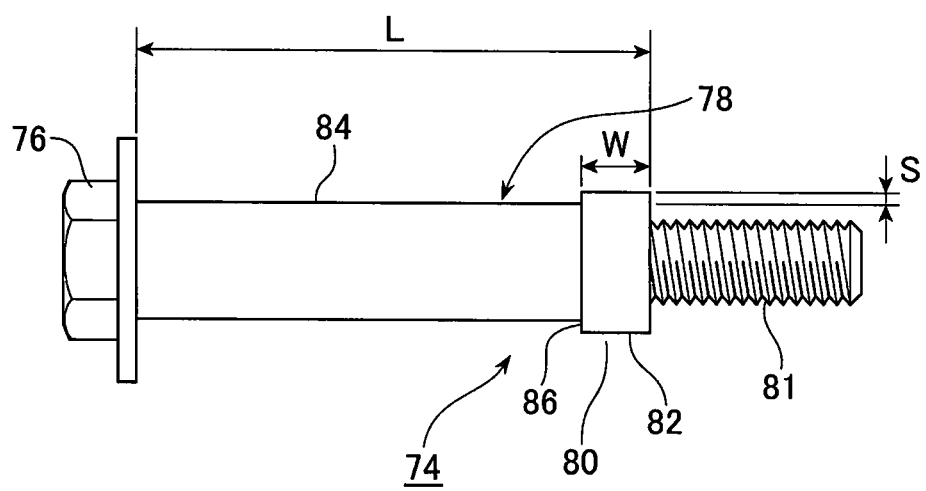
FIG. 5 is a side view showing the bolt 74 which is used for bolting the electrical reclining motor 34 of the seat for the vehicle in the embodiment of the present invention.

As shown in FIGS. 3 to 5, the bolt 74 comprises a head portion 76, a shank portion 78 with a circular cross-section, and a threaded portion 81 into which a nut 92 can be threaded, and a length L of the shank portion 78 corresponds to the length of the bolt through-hole 72. The shank portion 78 comprises an enlarged-diameter portion 82 on its end portion 80 and a reduced-diameter portion 84 adjacent to the enlarged-diameter portion 82 with being concentric to each other.

A step S of a stepped portion 86 between the enlarged-diameter portion 82 and the reduced-diameter portion 84 and a width W in a longitudinal direction of the shank portion 78 of the enlarged-diameter portion 78 are set so as to keep an intersecting angle α between the electrical reclining motor 34 and the connecting rod 30 constant.

In this case, the step S of the stepped portion 86 between the enlarged-diameter portion 78 and the reduced-diameter portion 84 is set in accordance with a length of the bolt through-hole 72.

In addition, the enlarged-diameter portion 82 is provided on an end portion 80 opposite to the head portion 76, whereby the buckling of the bolt can be prevented and an axial force can be maintained by securing an area of a seat of the bolt 74. The width W in a longitudinal direction of the shank portion 78 of the enlarged-diameter portion 82 is set in accordance with a length of the bolt through-hole 72, and a clearance between an outer peripheral surface of the enlarged-diameter portion 82 and an inner peripheral surface of the bolt through-hole 72 are provided, from the standpoint of an assembly property of the bolt 74 into the bolt through-hole 72.

The electrical reclining motor 34 is bolted on the one of the pair of side frames 20A by making the bolt 74 pass through the bolt through-hole 72 after a rubber bushing 88 is passed through the head portion. The rubber bushing 88 prevents the electrical reclining motor 34 from being rigidly tightened on the side frame 20A, causing the electrical reclining motor 34 to smoothly move so as to relieve a load on the electrical reclining motor 34.

More specifically, the electrical reclining motor 34 is provided along an inner surface of the one of the pair of side frames 20A,B so as to make the bolt through-hole 72 horizontally oriented, while the reclining apparatus 16 is provided on an outer surface of the side surfaces of each of the pair of side frames 20A,B. The bolt 74 is made to pass through the bolt through-hole 72 and the one of the pair of side frames 20A,B to be tightened by a nut 92 at the outer surface of the side surfaces of each of the pair of side frames 20A,B.

Figure 7:
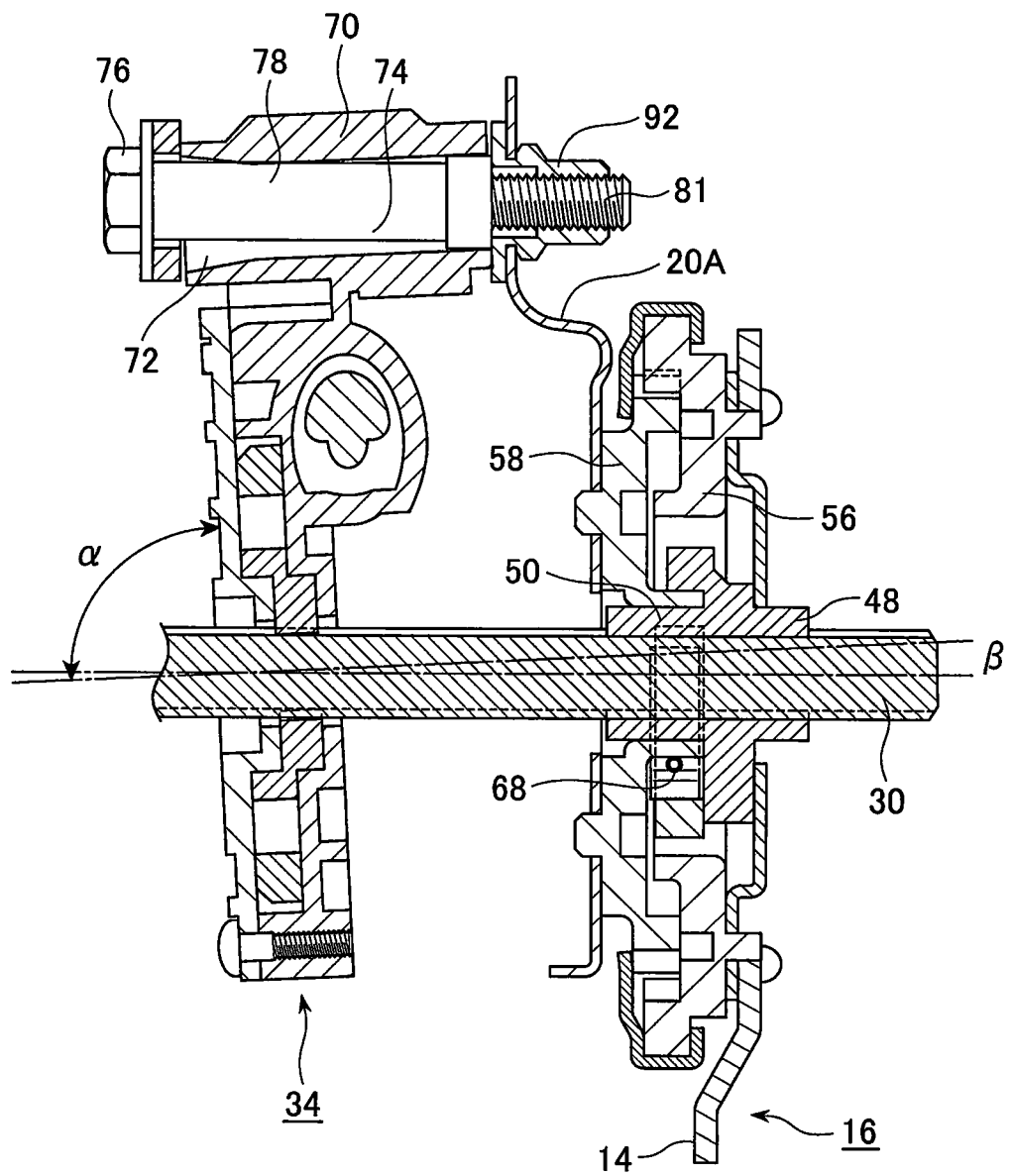
FIG. 7 is a cross-sectional partial side view showing a situation in which the reclining apparatus 16 and the electrical reclining motor 34 of the seat for the vehicle in the embodiment of the present invention are connected on the connecting rod 30.

An effect with such a structure including its reclining action of the seat for the vehicle will be described with reference to FIG. 7.

Firstly, the central shaft 48 of the reclining apparatus 16 is rotated about the connecting rod 30 by rotating the connecting rod 30 by means of the electrical reclining motor 34.

Then, the central shaft 48 is caused to hit the end surface of the arcuate bush 64, so that the arcuate bush 64 is caused to be pushed to be actuated about the connecting rod 30.

Then, by the above actuation of the arcuate bushing 64, the cam 66A is caused to be actuated so as to move away from the locking spring 68 about the connecting rod 30 while resisting the biasing force by the locking spring 68, due to the friction between the inner peripheral surface 62 of the arcuate bushing 64 and the cam 66A, and as a result, the intrusion of the cam 66A is released.

Then, the mating position of the internal teeth 38 of the outer plate 56 with the external teeth 42 of the inner plate 58 becomes shifted due to the fact that the axial position of the central shaft 48 becomes deviated to be eccentric after the actuation of the cam 66A (the release of the intrusion), so that the internal teeth gear 40 becomes angularly deviated after the central shaft 48 rotates by one revolution, by a difference between the number of the teeth of the internal teeth 38 and that of the external teeth 42.

And as a result, the reclining angle of the pair of side frames 20A,B of the seat back fixed on the external teeth gear 44 of the inner plate 58, or the reclining angle of the seat back, can be adjusted in a desired manner by rotating the central shaft 48 by means of the electrical reclining motor 34.

According to the seat for the vehicle including the above structure, the seat back frame structure 12 can be inclined relative to the seat cushion frame structure 14 in a desired manner with a high reduction gear ratio by rotating the connecting rod 30 about a horizontal direction by driving the electrical reclining motor 34 and by driving the external teeth gear 44 in an eccentric manner by the eccentric driving means 46 of the reclining apparatus 16 to mate the internal teeth 38 with the external teeth 42 whose number of the teeth is less than that of the internal teeth 38.

In a case where the electrical reclining motor 34 is fixed on the side surface of one of the pair of side frames 20A,B by bolt, since the bolt 74 which fits into said bolt through-hole 72 and is provided for fixedly bolting said electrical reclining motor 34 on said one of the side surfaces of the one of the pair of side frames 20A,B comprises a head portion 76 and a shank portion 78 with a circular cross-section, and said shank portion 78 comprises an enlarged-diameter portion 82 on its end portion 80 and a reduced-diameter portion 84 adjacent to the enlarged-diameter portion 82 with being concentric to each other, the reclining of the seat back can be smoothly and stably adjusted by making the inclination of the electrical reclining motor 34 feasible, even if the electrical reclining motor 34 is diagonally mounted on the seat back frame structure 12 in a case where the electrical reclining motor 34 is fixedly connected on the seat back frame structure 12, or even if the electrical reclining motor 34 becomes inclined due to a deformation of the seat back frame structure 12 after such a fixedly connection.

For instance, since the electrical reclining motor 34 can be empirically inclined to the connecting rod 30 at an angle equal to, or less than 40°, the intersecting angle α between the electrical reclining motor 34 and the connecting rod 30 can be kept constantly unchanged (90°), in order to make the electrical reclining motor 34 incline relative to the bolt 74 so as to absorb this inclination angle β.

As described above, the preferred embodiment of the present invention was described in detail, however, it is evident that those skilled in the art could modify or change the embodiment in various manners without departing from the scope of the present invention.

For instance, in this embodiment, the electrical reclining motor 34 is mounted on the inner surface of the side surfaces of the one of the pair of side frames 20A,B, however, is may be mounted on the outer surface of the side surfaces thereof.

For instance, in this embodiment, the electrical reclining motor 34 is mounted on the inner surface of the side surfaces of the one of the pair of side frames 20A,B so as to be vertically oriented with its motor body being located an upper side, however, is may be mounted so as to be horizontally oriented.

For instance, in this embodiment, the electrical reclining motor 34 is mounted on the outer surface of the side surfaces of the one of the pair of side frames 20A,B so as to be tightened thereto by means of the nut 92, however, is may be mounted on the inner surface of the side surfaces of the one of the pair of side frames 20A,B so as to be tightened thereto by means of the nut 92.

What is claimed is:

1. A seat for a vehicle comprising a seat back frame structure, a lower end of which is connected to a rear end of a seat cushion frame structure in such a way that the seat back frame structure can be inclined relative to the seat cushion frame structure, said seat back frame structure including a pair of side frames each of which extends in a vertical direction of the vehicle, said seat for the vehicle further comprising a through-hole provided on a lower end portion of each said side frame, a connecting rod extending through each of the through-holes so as to be rotatable about a horizontal direction, an electrical reclining motor rotating said connecting rod and provided along one side surface of one of said side frames, and a reclining apparatus provided on another side surface of each said side frame, a bolt through-hole being provided on a non-rotational driven solid portion of said electrical reclining motor, a bolt which fits into said bolt through-hole is provided for directly and fixedly bolting said electrical reclining motor on said one side surface of the one side frame, said bolt comprising a head portion, a shank portion with a circular cross-section, and a threaded portion, in this order, said shank portion comprises an enlarged-diameter portion on its end portion at a threaded portion side of said bolt and a reduced-diameter portion adjacent to the enlarged-diameter portion, the enlarged-diameter portion and the reduced-diameter portion being concentric to each other, and a diameter of the enlarged-diameter portion is set for insertion into said bolt through-hole.

2. The seat for the vehicle according to claim 1, wherein a step of a stepped portion between said enlarged-diameter portion and said reduced-diameter portion and/or a width in a longitudinal direction of said shank portion of said enlarged-diameter portion are set so as to keep an intersecting angle between said electrical reclining motor and said connecting rod constant.

3. The seat for the vehicle according to claim 2, wherein said step of the stepped portion between said enlarged-diameter portion and said reduced-diameter portion and said width in the longitudinal direction of said shank portion of said enlarged-diameter portion are set so as to keep the intersecting angle between said electrical reclining motor and said connecting rod constant.

4. The seat for the vehicle according to claim 2, wherein said step of the stepped portion between said enlarged-diameter portion and said reduced-diameter portion is set in accordance with a length of said bolt through-hole.

5. The seat for the vehicle according to claim 4, wherein said enlarged-diameter portion is provided on an end portion opposite to said head portion, said width in the longitudinal direction of said shank portion of said enlarged-diameter portion is set in accordance with the length of said bolt through-hole.

6. The seat for the vehicle according to claim 1, wherein said electrical reclining motor is bolted on said one of the side frames by making said bolt pass through the bolt through-hole after a rubber bush passes through said head portion.

7. The seat for the vehicle according to claim 6, wherein said electrical reclining motor is provided along an inner side surface of said one side frame so as to make said bolt through-hole horizontally oriented, said reclining apparatus is provided on an outer side surface of each said side frame, said bolt is made to pass through said bolt through-hole and is tightened with a nut disposed at said outer side surface of said one side frame.

8. The seat for the vehicle according to claim 1, wherein said reclining apparatus comprises an internal teeth gear which is provided around said connecting rod and is fixed on said seat cushion frame structure or said one side frame, an external teeth gear which is provided around said connecting rod so as to mate with said internal teeth gear and is fixed on said one side frame or said seat cushion frame structure, and an eccentric driving means for driving said internal teeth gear or said external teeth gear in an eccentric manner by being driven by rotation of said connecting rod.

9. The seat for the vehicle according to claim 8, wherein said internal teeth gear comprises internal teeth provided around said connecting rod in a concentric manner, and said external teeth gear comprises external teeth provided around said connecting rod in a concentric manner with the number of its teeth mating with said internal teeth being less than that of the internal teeth.

10. The seat for the vehicle according to claim 1, wherein the enlarged-diameter portion and the reduced-diameter portion of the shank portion are disposed longitudinally between the head portion and the threaded portion, and the enlarged-diameter portion is disposed longitudinally between the threaded portion and the reduced-diameter portion.

11. The seat for the vehicle according to claim 10, wherein the enlarged-diameter portion has a diameter which is greater than a diameter of the reduced-diameter portion.

12. A reclining unit comprising a through-hole provided on a lower end portion of each of a pair of side frames of a seat back frame structure, a connecting rod extending through each of the through-holes so as to be rotatable about a horizontal direction, an electrical reclining motor rotating said connecting rod and provided along one side surface of one of said side frames, and a reclining apparatus provided on another side surface of each said side frame, said reclining apparatus comprising an internal teeth gear which is provided around said connecting rod and is fixed on said seat cushion frame structure or said one side frame, an external teeth gear which is provided around said connecting rod so as to mate with said internal teeth gear and is fixed on said one side frame or said seat cushion frame structure, and an eccentric driving means for driving said internal teeth gear or said external teeth gear in an eccentric manner by being driven by rotation of said connecting rod, a bolt through-hole being provided on a non-rotational solid portion of said electrical reclining motor, a bolt which fits into said bolt through-hole being provided for directly and fixedly bolting said electrical reclining motor on said one side surface of the one side frame, said bolt comprising a head portion, a shank portion with a circular cross-section, and a threaded portion, in this order, said shank portion comprising an enlarged-diameter portion on its end portion at a threaded portion side of said bolt and a reduced-diameter portion adjacent to the enlarged-diameter portion, the enlarged-diameter portion and the reduced-diameter portion being concentric to each other, and a diameter of the enlarged-diameter portion is set for insertion into said bolt through-hole, and a step of a stepped portion between said enlarged-diameter portion and said reduced-diameter portion and a width in a longitudinal direction of said shank portion of said enlarged-diameter portion being set so as to keep an intersecting angle between said electrical reclining motor and said connecting rod constant.

13. The reclining unit according to claim 12, wherein the enlarged-diameter portion and the reduced-diameter portion of the shank portion are disposed longitudinally between the head portion and the threaded portion, and the enlarged-diameter portion is disposed longitudinally between the threaded portion and the reduced-diameter portion.

14. The reclining unit according to claim 13, wherein the enlarged-diameter portion has a diameter which is greater than a diameter of the reduced-diameter portion.

15. A reclining apparatus for a vehicle, the reclining apparatus comprising:
a seat back frame with a lower end that is connected to a rear end of a seat cushion frame such that the seat back frame can be inclined relative to the seat cushion frame, said seat back frame having a first side frame and a second side frame, the first side frame and the second side frame each extending substantially vertically, the first side frame having a first through-hole extending through a lower portion thereof, and the second side frame having a second through-hole extending through a lower portion thereof, the first through-hole being positioned opposite to the second through-hole;
a connecting rod extending through the first through-hole and the second through-hole, the connecting rod being capable of rotation;
an electrical reclining motor for rotating said connecting rod, the electrical reclining motor being provided along a surface on a side of one of the first side frame and the second side frame;
a reclining apparatus being disposed on a side of one of the first side frame and the second side frame;
a bolt through-hole provided on a solid portion of said electrical reclining motor; and
a bolt that fits into said bolt through-hole, the bolt being provided for directly and fixedly bolting said electrical reclining motor on said one side frame, said bolt having a head portion, a shank portion having a circular cross-section, and a threaded portion, in this order, wherein said shank portion has an enlarged-diameter portion on an end portion thereof at a threaded portion side of said bolt and a reduced-diameter portion positioned adjacent to the enlarged-diameter portion, the enlarged-diameter portion and the reduced diameter portion being oriented concentrically relative to each other, a diameter of the enlarged-diameter portion being set for insertion into said bolt through-hole.

16. The reclining apparatus according to claim 15, wherein the enlarged-diameter portion and the reduced-diameter portion of the shank portion are disposed between the head portion and the threaded portion, and the enlarged-diameter portion is disposed between the threaded portion and the reduced-diameter portion.

17. The reclining apparatus according to claim 16, wherein the enlarged-diameter portion has a diameter which is greater than a diameter of the reduced-diameter portion.

* * * * *